United States Patent [19]
Walter et al.

[11] Patent Number: 5,726,900
[45] Date of Patent: Mar. 10, 1998

[54] GROUND DETECTION CIRCUIT FOR A THREE WIRE POWER SUPPLY

[75] Inventors: Mark Richard Walter, Bridgeport; David Philip Eckel, Wetherfield; Thomas James Batko, Wallingford, all of Conn.

[73] Assignee: Hubbell Incorporated, Orange, Conn.

[21] Appl. No.: 554,377

[22] Filed: Nov. 8, 1995

Related U.S. Application Data

[63] Continuation-in-part of Ser. No. 412,502, Mar. 29, 1995, which is a continuation of Ser. No. 382,691, Feb. 2, 1995, abandoned.

[51] Int. Cl.⁶ .................................................. H02H 3/16
[52] U.S. Cl. .................... 364/483; 364/482; 364/550; 340/649; 340/650; 361/45; 361/50; 361/87; 361/93; 361/98; 324/509
[58] Field of Search ................................. 364/481–483, 364/492, 550; 340/635, 650, 651, 649, 652, 506; 324/509–512, 522, 525, 544, 551, 555, 557; 361/20, 42, 45, 46, 49, 50, 54, 57, 59, 71, 78, 87, 88, 90, 92–93, 115, 98

[56] References Cited

U.S. PATENT DOCUMENTS

| | | | |
|---|---|---|---|
| 3,810,003 | 5/1974 | Portoulas | 324/508 |
| 3,996,496 | 12/1976 | Volk, Jr. | 361/50 |
| 4,087,846 | 5/1978 | Hughes et al. | 361/42 |
| 4,598,331 | 7/1986 | Legatti | 361/46 |
| 4,685,022 | 8/1987 | Nichols, III et al. | 361/44 |
| 4,991,105 | 2/1991 | Pimental | 364/483 |
| 5,101,160 | 3/1992 | Barjonnet et al. | 324/510 |
| 5,105,325 | 4/1992 | Lawrence | 361/42 |
| 5,119,031 | 6/1992 | Foulkes et al. | 324/510 |
| 5,202,662 | 4/1993 | Bienwald et al. | 335/18 |
| 5,345,110 | 9/1994 | Renfro et al. | 307/272.3 |
| 5,424,894 | 6/1995 | Briscall et al. | 361/45 |
| 5,428,494 | 6/1995 | Ahuja | 361/62 |
| 5,446,682 | 8/1995 | Janke et al. | 364/571.01 |
| 5,448,491 | 9/1995 | Janke et al. | 364/483 |
| 5,450,328 | 9/1995 | Janke et al. | 364/482 |

*Primary Examiner*—Emanuel T. Voeltz
*Assistant Examiner*—Tuan Q. Dam
*Attorney, Agent, or Firm*—Jerry M. Presson; Stacey J. Longanecker

[57] ABSTRACT

A three wire power supply circuit is provided comprising a circuit for monitoring the integrity of the ground connection of the power supply circuit. A circuit element is provided in the line-to-ground current path which conducts when current flows in the line-to-ground current path and is nonconductive when the ground connection is poor or absent. A microcontroller monitors the output of the circuit element and operates a buzzer or a light emitting diode to indicate when the ground connection is poor or absent.

18 Claims, 4 Drawing Sheets

GROUND DETECTION CIRCUIT FOR A THREE WIRE POWER SUPPLY

This application is a continuation-in-part of U.S. patent application Ser. No. 08/412,502, filed Mar. 29, 1995, which is a continuation of U.S. patent application Ser. No. 08/382,691, filed Feb. 2, 1995 (abandoned), the entire subject matter of which is hereby incorporated herein by reference for all purposes. Related subject matter is disclosed in U.S. patent applications Ser. No. 08/501,847 (pending), filed on Jul. 13, 1995 and is incorporated herein by reference for all purposes.

A portion of the disclosure of this patent document contains material which is subject to copyright protection. The copyright owner has no objection to the facsimile reproduction by anyone of the patent disclosure, as it appears in the Patent and Trademark Office files or records, but otherwise reserves all rights under U.S. copyright laws whatsoever.

FIELD OF THE INVENTION

The invention relates to three wire electrical power supply circuits for connecting a load to an alternating current (AC) power source with means for detecting and annunciating when the ground connection is poor or absent. The invention further relates to transducer and load control systems with means for providing switched DC voltages to circuit components.

BACKGROUND OF THE INVENTION

A number of electrical power supply circuits such as wall switch units for lighting fixtures are potentially hazardous to individuals (e.g., repairmen). Devices such as wall switches are usually connected to the ground terminal of a three wire AC power source in order to connect the wall switch with earth ground. This reduces the likelihood that circuit component failures and deterioration of wiring insulation will expose a repairman or operator to a dangerously high potential or current relative to earth ground.

A need exists for a circuit which notifies a repairman or other user when the ground connector is poor or absent in a power supply circuit. This notification should be provided each time the power supply circuit is powered on or after it is lost during normal operation of the device. Thus, before a repairman commences servicing a wall switch unit, there is assurance that the ground connection is present.

SUMMARY OF THE INVENTION

In accordance with an aspect of the invention, a three wire power supply circuit is provided which comprises a circuit element in the line-to-ground current path. The circuit element conducts when current flows in the line-to-ground current path and is nonconductive when the ground connection is poor or absent. A microcontroller monitors the output of the circuit element and operates a buzzer or a light emitting diode to indicate when the ground connection is poor or absent. Alternatively, the microcontroller can operate an audible and/or a visible indicator to indicate when the ground connection is present.

In accordance with another aspect of the invention, the microcontroller is programmed to monitor the output of the circuit element and to operate the indicator each time the power supply circuit is powered on by an AC power source or after the power supply circuit is dropped during normal operation.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENTS

Figure 1A:
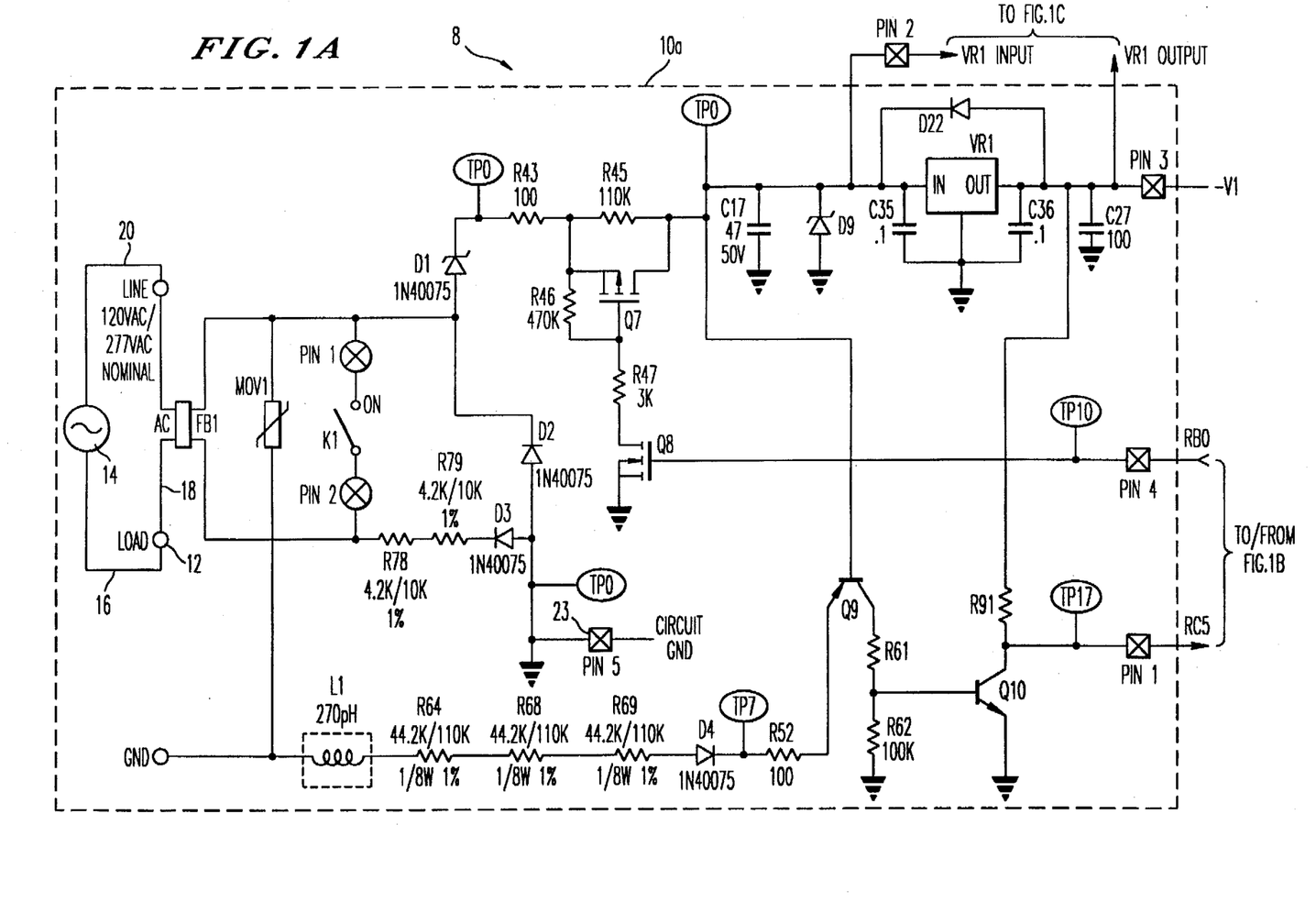
FIGS. 1A, 1B and 1C provide a schematic circuit diagram of a transducer and load control system having a power supply circuit constructed in accordance with an embodiment of the present invention.
Figure 1B:
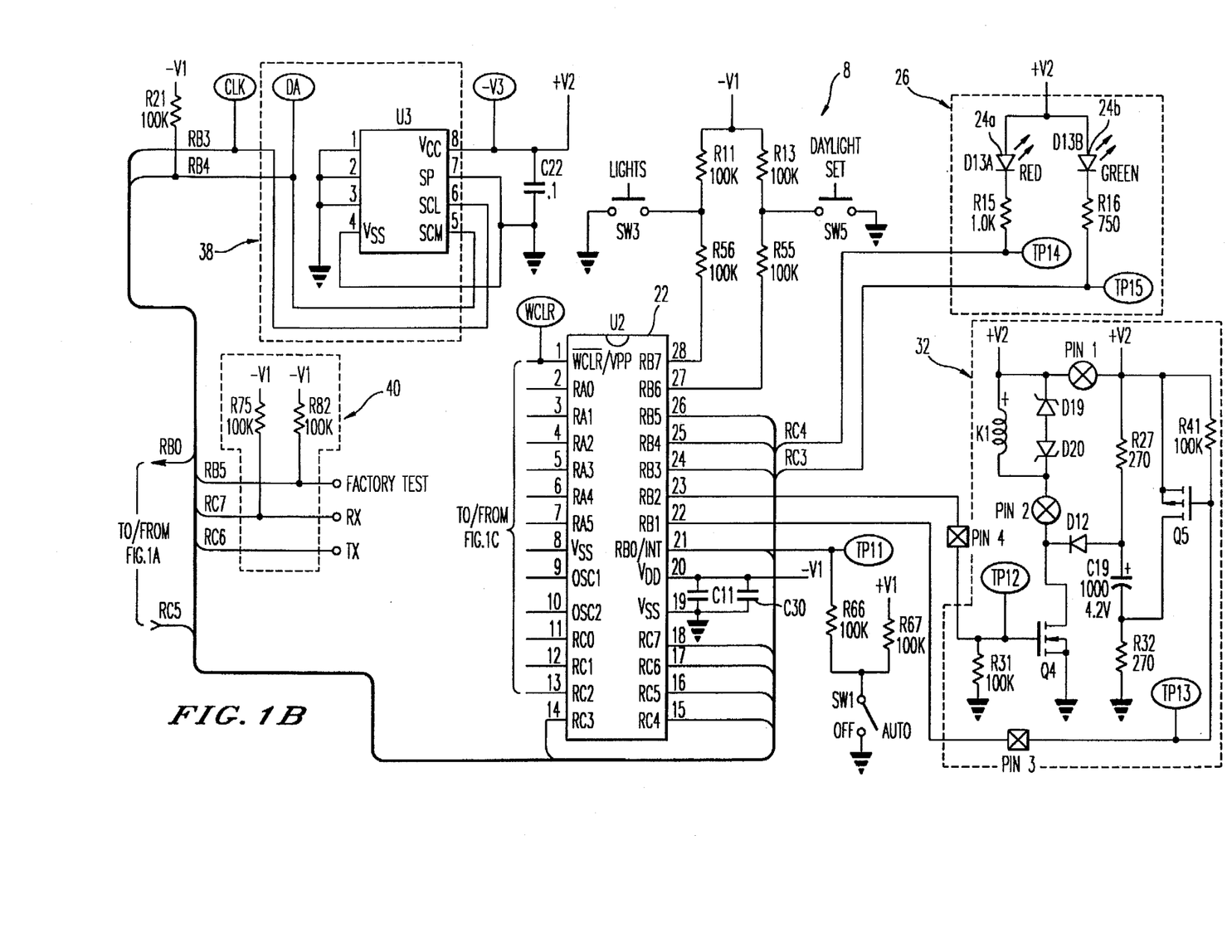
Figure 1C:
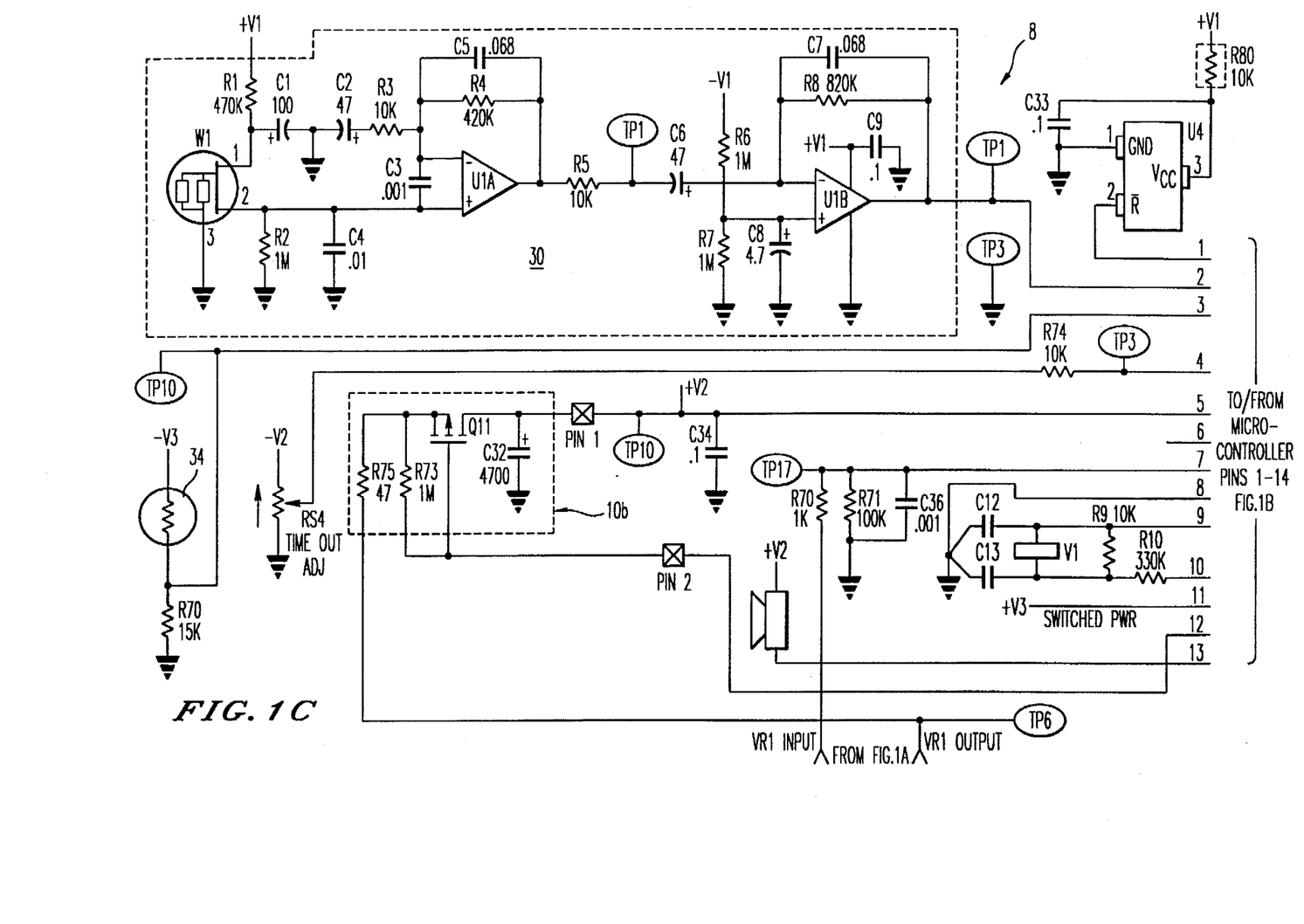

FIGS. 1A, 1B and 1C collectively provide a schematic circuit diagram of a transducer and load control system 8 comprising a three wire power supply circuit 10 constructed in accordance with an embodiment of the present invention. Boxes 10a and 10b, which are drawn in phantom lines in FIGS. 1A and 1C, respectively, collectively illustrate the power supply circuit 10. In the illustrated embodiment, the system 8 controls the supply of power to a lighting fixture using a passive infrared motion sensor. The system 8, however, can be used with a number of different types of loads such as smoke alarms, dimmers, as well as security and temperature control systems, among others.

The power supply circuit 10 connects a load 12 such as the lighting fixture to an AC power source 14. The load 12 is connected to the neutral conductor 16 of the AC power source 14. The power supply circuit 10 is connected to the load 12 via a load conductor 18, and is connected to the AC power source via the AC power or hot line conductor 20.

As shown in FIG. 1B, the system 8 comprises a microcontroller 22 which is preferably a microcontroller number PIC16LC73 manufactured by Microchip Technologies, Inc., Arizona. The power supply circuit 10 comprises a switch mechanism K1 for controllably completing or interrupting the current path between the line or power conductor 20 and the return path to the AC source, i.e., the load conductor 18, the load 12 and the neutral conductor 16. The switch mechanism K1 can be, but is not limited to, a slide switch, a press switch, a relay, a semi-conductor switch, an opto coupler, a thyristor, or any other mechanical, electro-mechanical or electronic device for opening and closing a circuit. The switching mechanism K1 can be controlled manually (e.g., a press button or slide switch SW1), or by an electronic control circuit which can include, but does not require, a microcontroller. For example, the switch mechanism K1 of the circuit 10 can be provided in the form of a relay which is switched to the ON position by the microcontroller 22 to provide power to the load 12, and to the OFF position to power down the load 12. The coil for relay K1 is in the relay driver circuit 32 (FIG. 1B).

In FIG. 1A, the circuit 10 uses two half-wave rectifier circuits which operate on alternate half-cycles of the input power. The diodes D1 and D3 and the resisters R78 and R79 constitute a first half-wave rectifier circuit in the line-to-load current path. Diodes D2 and D4 and resisters R64, R68 and R69 represent a second half-wave rectifier circuit for the line-to-ground current path.

When the relay K1 is open (i.e., OFF) and input power is at a positive polarity with respect to ground, diodes D1 and D3 conduct. Current flows through the ferrite bead FB1, diode D1, resistor R43, and through resistor R45 or the transistor Q7, depending on whether the transistor Q7 is conducting as described below, to charge the capacitor C17. The return current path is through the circuit ground of capacitor C17 to pin 5, indicated at 23, and then to diode D3 and resistors R78 and R79. The inverted triangles (e.g., ground connection 21 in FIG. 1A) throughout the schematic circuit diagram shown FIGS. 1A, 1B and 1C represent circuit ground connections. During this time, diodes D2 and D4 are reversed biased and are therefore turned off. The resistors R78 and R79 can be selected to limit current to 5.0 mA when the relay K1 is OFF to allow actuation of LEDs 24 and charging of the capacitor C17, among other power supply functions. When the relay K1 is closed, the current flows through the relay to the load 12.

When the polarity of the input power changes so that the line signal is at a negative potential with respect to ground, diodes D2 and D4 conduct, and diodes D1 and D3 are reversed biased or turned off. Current flows from ground to inductor L1, resistors R64, R68, R69, diode D4, resistor R52, and the emitter-base junction of transistor Q9 to charge the capacitor C17 and bias the diode D9. The return path is through the ground connection of the capacitor to diode D2 via the pin 5. This current path occurs on the negative half-cycle regardless of whether the relay K1 is ON or OFF.

The combination of using two separate half-wave rectifier circuits, which operate at opposite polarities and on alternate half-cycles of the input power, provides full-wave rectified power to the circuit 10, yet eliminates interaction between the line-to-load and line-to-ground current paths since the half-wave rectifier circuits are not conducting simultaneously. The isolation of the line-to-load and line-to-ground current paths is advantageous when, for example, safety requirements restrict leakage currents in one or both paths. The use of two half-wave rectifier circuits reduces the likelihood that current leakage in one of the paths contributes to undesired current flow in the other path.

With reference to FIG. 1A, an inductor L1 is placed in the line-to-ground current path to reduce the effect on the circuit 10 of any noise present on the AC line. The resistors R64, R68 and R69 limit line-to-ground current to a selected, predetermined level, e.g., 0.5 milliamperes (mA). The transistor Q7 normally operates in a conductive state. The microcontroller 22 is programmed to turn on the transistor Q8 when the switch SW1 is switched to the OFF position. When transistor Q8 is in a conducting state, the transistor Q7 is turned off. The line-to-load current is then limited by resistors R45, R78, and R79 to a preset limit (e.g. 0.5 mA). Thus, when a person servicing the lighting fixture, for example, switches the circuit 10 to OFF via switch SW1 (FIG. 1B), the line-to-load current is limited for safety reasons by opening relay K1. This is necessary in the event that the relay K1 was not switched to an OFF position by the microcontroller or was operating in a daylight override mode where current is not limited.

In accordance with an embodiment of the present invention, a transistor Q9 (FIG. 1A) is provided having a base connected to the resister R45. Any time current flows through the line-to-ground current path, the transistor Q9 is placed in a conducting state. Accordingly, a transistor Q10 is placed in a conducting state. The transistor Q10 generates output pulses as long as the ground conductor is connected and line-to-ground current flows. The microcontroller 22 is programmed to monitor the output of the transistor Q10 for the presence of pulses. When the ground is not present, no pulses are detected by the microcontroller, and the microcontroller 22 is programmed to generate an audible tone via the buzzer BZ1 and/or give a visual indication that a problem exists with the ground connection (e.g., illuminate a light emitting diode (LED) 24 in an LED driver circuit 26). Thus, service personnel receive an indication that the circuit 10 is missing or has an improper ground connection. Alternatively, the microcontroller 22 can be programmed to annunciate when a ground connection is present.

The ground connection monitoring process of the microcontroller 22 is preferably performed during a start up routine for the system 8, but can occur when the system 8 is running and the ground connection becomes open. If the lighting fixture is turned on, the microcontroller 22 can sense an open ground connection, turn off the load and annunciate in a manner similar to the start-up routine. The program code for controlling the microcontroller in accordance with the start up routine is provided in Appendix A and will be described in connection with the flow chart in FIG. 2.

With continued reference to FIGS. 1A, 1B and 1C, the power supply circuit 10 comprises a voltage regulator VR1, the input of which is monitored by the microcontroller 22 in accordance with another aspect of the invention. The circuit 10 comprises a large capacitor C32 (as shown in box 10B in FIG. 1C). A transistor Q11 is activated via the microcontroller 22 to apply a pulse current to the capacitor C32 to charge the capacitor. While the capacitor C32 is charging and Q11 is ON, the amount of available supply voltage decreases. The microcontroller is programmed to actuate transistor Q11 when sufficient supply current is available. The sufficiency of the supply current is determined via a feedback loop wherein the microcontroller monitors both the voltage regulator VR1 input and the capacitor C32. The microcontroller compares the voltage regulator input with threshold values which are variable within the program code. If the voltage regulator input is above a threshold value (e.g., 8 volts), the transistor Q11 is actuated via a microcontroller output signal. If the voltage regulator input is below the threshold value, no modulated pulses are generated by the microcontroller to replenish the charge on the capacitor C32. The voltage on the capacitor C32 is then determined by the microcontroller, which activates transistor Q11 again if more capacitor voltage is desired, and sufficient supply current is available.

By monitoring the voltage regulator input, the microcontroller self-regulates the voltage available from the capacitor C32, that is, the ability to charge the capacitor depends on the energy in the circuit, as detected at the voltage regulator input. This eliminates the possibility of charging the capacitor C32 using pulses with widths that are too large. The microcontroller is also programmed to selectively turn off certain high current loads such as the LEDs 24 to facilitate rapid charging the capacitor C32. For example, selected components can be turned off if the capacitor C32 threshold, which is variable in the microcontroller program code, falls below a predetermined threshold (e.g., 3.7 volts). Further, if the voltage at the voltage regulator input is below a minimum threshold (e.g., 6 volts), the microcontroller is programmed to open the relay K1 to power down the load. This ensures that when power is restored, the capacitor C32 can be charged rapidly to begin operation of the system 8.

The microcontroller 12 has an output RC0 for providing switched power to devices having higher current requirements relative to most of the components in the circuit 10. For example, a photocell 34, a resistor R54 for time out adjustments, and an EEPROM 38 are provided with switched power from the microcontroller 22, that is, pulse power verses steady state power in accordance with a signal generated by the microcontroller and in conjunction with the microcontroller 22 requiring use of these components.

The microcontroller 22 is connected to a motion sensing circuit 30, a relay driver circuit 32, a photocell 34, the LED driver circuit 26, the EEPROM 38, an external input device interface 40, and a number of push button switches, such as a LIGHTS switch SW3, indicated at 42, and a DAYLIGHT SET switch SW5 indicated at 44. The motion sensor 30, the EEPROM 38, and the photocell 34 are described in co-pending application Ser. No. 08/412,502 pending, filed Mar. 29, 1995, which is incorporated herein by reference. The relay driver circuit 32, and the LED circuit 36 are similar in operation to those described in the co-pending application. The operation of the LIGHTS switch and the DAYLIGHT SET switch, as well as the external input device interface 40, are also described in the co-pending application.

Figure 2:
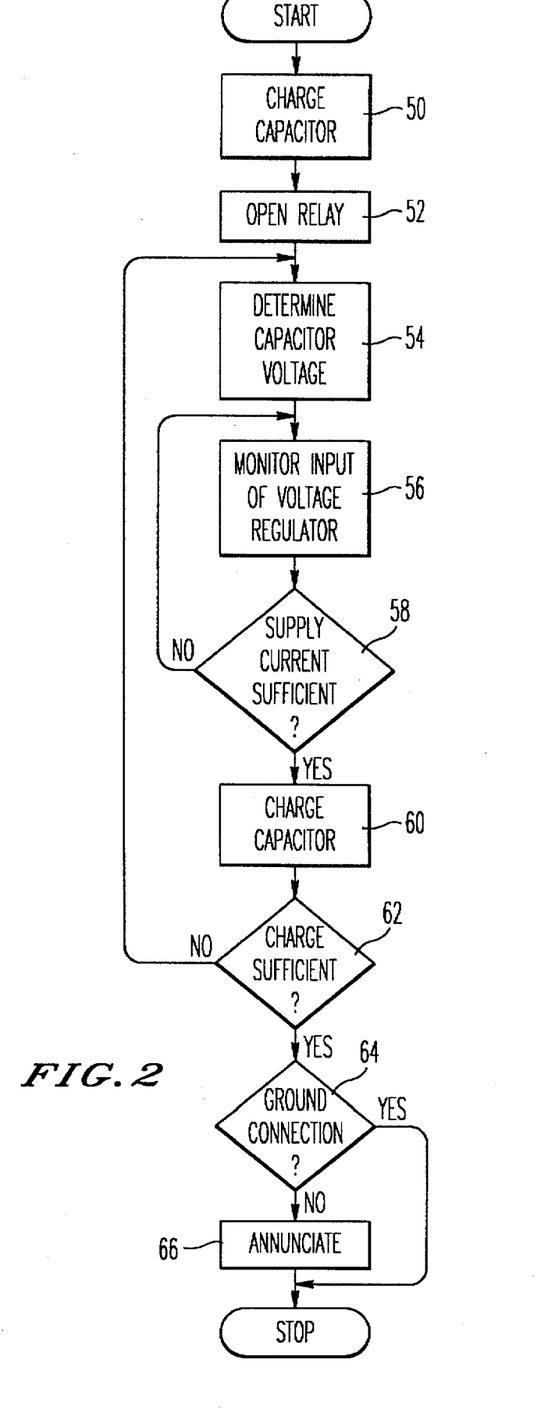
FIG. 2 is a flow chart depicting a sequence of operations for operating the system depicted in FIGS. 1A, 1B and 1C.

With reference to the flow chart in FIG. 2, the microcontroller 22 is preferably programmed in accordance with a start-up routine to charge the capacitor C32 (block 50). The microprocessor then opens the relay K1 to ensure that the load (e.g., the lighting fixture) is off (block 52). This is advantageous because the relay K1 may have been left in the ON position when the power supply circuit was shipped from the manufacturer, or because power to the power supply circuit 10 was interrupted when the power supply circuit was operating with the relay K1 in the closed or ON position.

The microcontroller determines the voltage on the capacitor C32 via one of the analog-to-digital (A/D) converting inputs (e.g., RA3) on the microcontroller (block 54). If the capacitor voltage is less than a predetermined threshold (e.g., 8 volts), the microcontroller determines the voltage at the input of the voltage regulator VR1 via another A/D converting input (e.g., RA5), as shown in block 56. If the input voltage is below a predetermined threshold (e.g., 8 volts), then the supply current is not deemed to be sufficient to charge the capacitor. The microcontroller therefore does not activate the transistor Q11 to charge the capacitor, as indicated by the affirmative branch of the decision block 58. If sufficient supply current is available (e.g., 8 volts), the microcontroller supplies a pulse current to the capacitor C32 via the transistor Q11 to replenish the charge on the capacitor C32, as shown in block 60. As indicated by the negative branch of decision block 62, the microcontroller monitors the capacitor C32 voltage and the supply voltage and continues to charge the capacitor, provided sufficient supply current is available, until a desired capacitor voltage is obtained (e.g., capacitor C32 voltage is substantially equivalent to the V1 voltage in the system 8).

With continued reference to FIG. 2, the microcontroller is then programmed to determine if output pulses are being generated by the transistor Q10 (block 64). If they are not being generated, then the microcontroller generates a tone via the buzzer BZ1 and/or drives an LED 24 (block 66). Thus, an operator (e.g., a repairman) is notified that the ground connection is missing and that precautions need to be taken when handling the power supply circuit (e.g., wall switch unit for controlling a lighting fixture).

While certain advantageous embodiments have been chosen to illustrate the invention, it will be understood by those skilled in the art that various changes and modifications can be made herein without departing from the scope of the invention as defined in the appended claims.

Appendix A

STARTUP TESTS

| LOC | OBJECT CODE VALUE | LINE | SOURCE TEXT | | | |
|---|---|---|---|---|---|---|
| | | 0558 | | | | |
| | | 0559 | | | | |
| | | 0560: On startup, charge BigCap. | | | | |
| | | 0561 | | | | |
| | | 0562 | | | | |
| | | 0563 | | | | |
| | | 0564: BigCap STARTUP: | | | | |
| | | 0565 | | | | |
| | | 0566 | | | | |
| | | 0567 | | | | |
| | | 0568 | | | | |
| | | 0569 | | | | |
| | | 0570 | | | | |
| 0043 | 16A2 | 0571 | slup0 | bcf | SYSTAT, B_LIGHT | : ENSURE that lights go off |
| | | 0572 | slup1 | DI | | : Interrupts off |
| 0044 | 1368 | M | | bcf | INTCON, GIE | : IRPS OFF |
| | | 0573 | | DI | | |
| 0045 | 1368 | M | | bcf | INTCON, GIE | : IRPS OFF |
| 0046 | 0064 | 0574 | | clrwdt | | |
| | | 0575 | | | | |
| 0047 | | 0576 | STARTEST: | | | |
| | | 0577 | | AtoO | CBIGCAP | |
| 0047 | 141F | M | | bcf | ACCON0, ADON | : Turn A/D power on |
| 0048 | 3009 | M | | movlw | CBIGCAP | |
| 0049 | 009F | M | | movwf | ADCON0 | : Select channel |
| 004A | 0000 | M | | nop | | : Let CBIGCAP settle |
| 004B | 0000 | M | | nop | | |
| 004C | 151F | M | | bcf | ADCON0, GO_DONE | : Start conversion |
| 004D | 0000 | M | | nop | | |
| 004E | 0000 | M | | nop | | |
| 004F | 091E | M | | movfw | ADRES | : Get A/D result |
| 0050 | 101F | M | | bcf | ADCON0, ADON | : Turn A/D power off |
| 0051 | 3CF4 | 0578 | | sublw | BIGCAP_THRESH_HI | : Wait till we're WAY up there |
| 0052 | 1C03 2867 | 0579 | | BNC | poweron | : Up to speed. |

Appendix A

STARTUP TESTS

| LOC | OBJECT CODE VALUE | LINE | SOURCE TEXT | | | |
|---|---|---|---|---|---|---|
| | | 0580 | | AtcO | CPSUNREG | : Check incoming power |
| 0054 | 141F | M | | bcf | ADCON0, ADON | : Turn A/D power on |
| 0055 | 30E1 | M | | movlw | CPSUNREG | |
| 0056 | 009F | M | | movwf | ADCON0 | : Select channel |
| 0057 | 0000 | M | | ncp | | : Let CPSUNREG settle |
| 0058 | 0000 | M | | ncp | | |
| 0059 | 151F | M | | bcf | ADCON0, GO_DONE | : Start conversion |
| 005A | 0000 | M | | ncp | | |
| 005B | 0000 | M | | ncp | | |
| 005C | 081E | M | | movfw | ADRES | : Get A/D result |
| 005D | 101F | M | | bcf | ADCON0, ADON | : Turn A/D power off |
| 005E | 3C33 | 0581 | | sublw | PSUNREG_THRESH_LO | : THRESH - AtcO Go till we get low. |
| | | 0582 | | | | |
| 005F | 1C03 | 0583 | | SKFC | | |
| 0060 | 1097 | 0584 | | bcf | PSPORT, B_CAPGATE | : Above thresh, Charge BigCap. |
| 0061 | 1603 | 0585 | | SKPNC | | |
| 0062 | 1487 | 0586 | | bcf | PSPORT, B_CAPGATE | : Default off |
| | | 0587 | | | | |
| 0063 | 1C03 | 0588 | | SKPC | | |
| 0064 | 1507 | 0589 | | bcf | BEEPORT, B_BEEPWM | : Activity noise when charging |
| 0065 | 1107 | 0590 | | bcf | BEEPORT, B_BEEPWM | |
| 0066 | 2847 | 0591 | | goto | STARTEST | |
| | | 0592 | | | | |
| 0067 | | 0593 | poweron | | | |
| 0067 | 1EA2 | 0594 | | btfee | SYSTAT, B_LIGHT | : Turn lights off & recharge |
| 0068 | 286C | 0595 | | goto | pon1 | : Already done, Continue |
| | | 0596 | | EI | | : Type on for RYOFF |
| 0069 | 1786 | M | | bcf | INTCON, GIE | : IRPS ON |
| 006A | 2341 | 0597 | | call | RELAYOFF | : Lights off 1st time |
| 006B | 2844 | 0598 | | goto | slup1 | : Kick C one more time. |
| | | 0599 | | | | |
| 006C | | 0600 | pon1: | | | |
| | | 0601 | | | | |
| | | 0602 | : Check for ground, Interrupts should still be off here. | | | |
| | | 0603 | | | | |
| 006C | 3020 | 0604 | | movlw | 32 | : 20me * 8 * 160, @ 5 cycles/spin |
| 006D | 00F0 | 0605 | | movlf | AC0 | |
| 006E | 0064 | 0606 | | clrwdt | | |
| | | 0607 | | | | |
| 006F | 1E87 | 0608 | pon2 | btfss | PSPORT, B_GNDCK | |
| 0070 | 207C | 0609 | | goto | pon3 | : Got a low. We're CK1 |
| 0071 | 08F0 | 0610 | | decfez | AC0 | |
| 0072 | 286F | 0611 | | goto | pon2 | |
| | | 0612 | | | | |
| | | 0613 | : Timed out w/ no low on RC5, NO GROUP1 Beep & restart. | | | |
| | | 0614 | | | | |
| 0073 | 3002 | 0615 | | movlw | 2 | |
| | | 0616 | | setbank | 1 | |
| | | M | | if | 1 ** 0 | |
| | | M | | bcf | STATUS, 5 | : Clear bank bit. (Bank 0) |
| | | M | | endif | | |
| | | M | | if | 1 ** 1 | |
| 0074 | 1683 | M | | bcf | STATUS, 5 | |
| | | M | | endif | | |
| 0075 | 0092 | 0617 | | movwf | FR2&37F | : Croack for bad ground. (.5 normal freq) |
| | | 0618 | | setbank | 0 | |
| | | M | | if | 0 ** 0 | |
| 076 | 1283 | M | | bcf | STATUS, 5 | : Clear bank bit. (Bank 0) |
| | | M | | endif | | |
| | | M | | if | 0 ** 1 | |
| | | M | | bcf | STATUS, 5 | |
| | | M | | endif | | |
| | | 0619 | | EI | | |
| 077 | 1788 | M | | bcf | INTCON, GIE | : IRPS ON |
| 078 | 2300 | 0620 | | call | BEEP1 | |
| | | 0621 | | DI | | |
| 079 | 1388 | M | | bcf | INTCON, GIE | : IRPS OFF |
| | | 0622 | | DI | | |
| 07A | 1388 | M | | bcf | INTCON, GIE | : IRPS OFF |
| 07B | 2878 | 0623 | pon2a | goto | pon2a | |

What is claimed is:

1. An apparatus for monitoring a ground connection in a three wire power supply circuit which selectively connects and disconnects a load from an alternating current power source having line, neutral and ground conductors, said ground connection monitoring apparatus comprising:

generating means for generating an output signal;

control means connected between said line conductor and said ground conductor and connected to said generating means, said control means being configured to operate said generating means to generate said output signal when current flows between said line conductor and said ground conductor and to interrupt operation of said generating means when current does not flow between said line conductor and said ground conductor; and indicating means connected to at least one of said control means and said generating means and operable in response to said output signal to indicate at least one of the presence and the absence of current flow in said ground conductor.

2. A ground connection monitoring apparatus as claimed in claim 1, wherein said control means comprises a processor connected to said generating means for monitoring the output of said generating means for the occurrence of said output signal, and for controlling operation of said indicating means when said output pulse is not detected.

3. A ground connection monitoring apparatus as claimed in claim 2, wherein said processor is programmable to commence monitoring the output of said generating means when said power supply circuit is powered on using said power source during at least one of starting up said power supply circuit, and restarting said power supply circuit after an interruption in power from said power source.

4. A ground connection monitoring apparatus as claimed in claim 1, wherein said control means comprises a processor connected to said generating means for monitoring the output of said generating means for the occurrence of said output signal, and for controlling operation of said indicating means when said output pulse is detected.

5. A ground connection monitoring apparatus as claimed in claim 4, wherein said processor is programmable to commence monitoring the output of said generating means when said power supply circuit is powered on using said power source during at least one of starting up said power supply circuit, and restarting said power supply circuit after an interruption in power from said power source.

6. A ground connection monitoring apparatus as claimed in claim 1, wherein said generating means comprises a first transistor, and said control means comprises a second transistor having first and second terminals thereof connected to said line conductor and to said ground conductor, respectively, and a third terminal thereof connected to said first transistor, said second transistor being biased into a conducting state when current flows in said ground conductor, said second transistor being operable to bias said first transistor into a conducting state.

7. A ground connection monitoring apparatus as claimed in claim 1, wherein said indicating means is selected from the group consisting of an audible indicator and a visible indicator.

8. An apparatus for monitoring a ground connection in a three wire power supply circuit which selectively connects and disconnects a load from an alternating current power source having line, neutral and ground conductors, said ground connection monitoring apparatus comprising:

a generating circuit coupled to said line conductor and said ground conductor for generating an output signal when current flows between said line conductor and said ground conductor;

a processor connected to said generating circuit and programmable to monitor the output of said generating circuit for the occurrence of said output signal; and an indicator connected to said processor, said processor being programmable to control said indicator to indicate a condition selected from the group consisting of the absence and presence of current flow in said ground conductor.

9. A ground connection monitoring apparatus as claimed in claim 8, wherein said processor is programmable to commence monitoring the output of said generating circuit when said power supply circuit is powered on using said power source during at least one of starting up said power supply circuit, and restarting said power supply circuit after an interruption in power from said power source.

10. A ground connection monitoring apparatus as claimed in claim 8, wherein said generating circuit comprises a first transistor, and further comprising a second transistor having first and second terminals thereof connected to said line conductor and to said ground conductor, respectively, and a third terminal thereof connected to said first transistor, said second transistor being biased into a conducting state when current flows between said line conductor and said ground conductor, said second transistor being operable to bias said first transistor into a conducting state.

11. A ground connection monitoring apparatus as claimed in claim 8, wherein said indicator is selected from the group consisting of an audible indicator and a visible indicator.

12. A method of monitoring a ground connection in three wire power supply circuit which selectively connects and disconnects a load from an alternating current power source having line, neutral and ground conductors, said method comprising the steps of:

switching a circuit element in a current path comprising said line conductor and said ground conductor into a conducting state to generate an output signal when current flows through said current path, said circuit element operating in a nonconducting state and generation of said output signal being interrupted when current is not flowing through said current path;

monitoring said circuit element for said output signal to determine when said circuit element is in a conducting state; and operating an indicator when said circuit element is in one of a conducting state and a nonconducting state.

13. A method of monitoring a ground connection as claimed in claim 12, wherein said operating step comprises generating an audible tone.

14. A method of monitoring a ground connection as claimed in claim 12, wherein said operating step comprises operating a visible indicator.

15. A method of monitoring a ground connection as claimed in claim 12, wherein said monitoring step and said operating step occur when said power supply circuit is powered on using said power source during at least one of starting up said power supply circuit, and restarting said power supply circuit after an interruption in power from said power source.

16. A method of monitoring a ground connection as claimed in claim 12, wherein said switching step comprises the step of biasing a first transistor connected to the line conductor and the ground conductor into a conducting state.

17. A method of monitoring a ground connection as claimed in claim 16, wherein said monitoring step comprises the step of monitoring the output of a second transistor connected to said first transistor and operable to conduct when said first transistor is conducting and to generate output signals, and said operating step comprises the step of operating said indicator when said output signals are detected.

18. A method of monitoring a ground connection as claimed in claim 16, wherein said monitoring step comprises the step of monitoring the output of a second transistor connected to said first transistor and operable to conduct when said first transistor is conducting and to generate output signals, and said operating step comprises the step of operating said indicator when said output signals are not detected.

* * * * *